US010819518B2

(12) United States Patent
Kohli (10) Patent No.: US 10,819,518 B2
(45) Date of Patent: Oct. 27, 2020

(54) SYSTEMS AND METHODS FOR ADVANCED APPLICATION SECURITY (71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 200 days.

(21) Appl. No.: 16/159,305

(22) Filed: Oct. 12, 2018

(65) Prior Publication Data
US 2020/0119920 A1 Apr. 16, 2020

(51) Int. Cl.
*H04L 9/32* (2006.01)
*G06F 21/44* (2013.01)
*H04L 9/08* (2006.01)
*H04L 9/00* (2006.01)

(52) U.S. Cl.
CPC ............ *H04L 9/3213* (2013.01); *G06F 21/44* (2013.01); *H04L 9/006* (2013.01); *H04L 9/0866* (2013.01); *H04L 9/3268* (2013.01)

(58) Field of Classification Search
CPC . H04L 9/0866; H04L 9/3213; H04L 63/0807; H04L 63/0815; H04L 63/0876; G06F 21/44
See application file for complete search history.

(56) References Cited

U.S. PATENT DOCUMENTS

| 9,038,138 | B2 | 5/2015 | Trammel |
| 9,058,481 | B2 | 6/2015 | Prasad |
| 9,219,762 | B2 | 12/2015 | Burch |
| 9,419,961 | B2 | 8/2016 | Chastain |
| 9,576,111 | B2 | 2/2017 | Le Saint |
| 9,632,765 | B1* | 4/2017 | Falcone ................. H04W 4/60 |
| 9,648,496 | B2 | 5/2017 | Loughlin-McHugh |

(Continued)

FOREIGN PATENT DOCUMENTS

EP 2947593 A1 11/2015

OTHER PUBLICATIONS

PCT International Search Report and Written Opinion, Application No. PCT/US2019/048237, dated Dec. 15, 2019, 8 pps.

*Primary Examiner* — Minh Dinh
(74) *Attorney, Agent, or Firm* — Armstrong Teasdale LLP (57) ABSTRACT

A computer device configured to install computer applications is provided. The computer device includes at least one processor in communication with at least one memory device. The at least one processor is programmed to receive a request to install a first application on a user computer device. The at least one processor is also programmed to scan at least one memory device of the user computer device for a device token associated with a second application. Upon detection of the device token, the at least one processor is programmed to retrieve the device token from the at least one memory device of the user computer device. The at least one processor is further programmed to validate the retrieved device token. Upon validation of the device token, the at least one processor is also programmed to install the first application and associate the device token with the first application.

20 Claims, 5 Drawing Sheets

(56) References Cited

U.S. PATENT DOCUMENTS

| | | | |
|---|---|---|---|
| 9,781,103 B2 | 10/2017 | Moore | |
| 9,825,942 B2 | 11/2017 | Bowman | |
| 9,847,990 B1* | 12/2017 | de Boursetty | H04L 9/3213 |
| 9,942,043 B2 | 4/2018 | Palanisamy | |
| 2014/0013396 A1* | 1/2014 | Field-Eliot | H04L 63/0807 |
| | | | 726/4 |
| 2014/0331273 A1* | 11/2014 | Koneru | G06F 21/629 |
| | | | 726/1 |
| 2015/0365399 A1 | 12/2015 | Biswas et al. | |

* cited by examiner

SYSTEMS AND METHODS FOR ADVANCED APPLICATION SECURITY

BACKGROUND

The field of the invention relates generally to advanced security for applications and more specifically to methods and systems for leveraging existing device tokens during application installation.

Many applications use signed device tokens for improved security. The device token includes information about the device that the application is installed on. The applications transmit the device token to a remote server to identify the source of the communications when communicating with or requesting information from the remote server. However, the process of generating and maintaining signed device tokens may be resource intensive and require significant amounts of CPU, memory, and battery power. Accordingly, it would be advantageous to reduce the resource requirements of signed device token generation, while maintaining the provided security.

BRIEF DESCRIPTION

In one aspect, a computer device configured to install computer applications is provided. The computer device includes at least one processor in communication with at least one memory device. The at least one processor is programmed to receive a request to install a first application on a user computer device. The at least one processor is also programmed to scan at least one memory device of the user computer device for a device token associated with a second application. Upon detection of the device token, at least one processor is programmed to retrieve the device token from the at least one memory device of the user computer device. The at least one processor is further programmed to validate the retrieved device token. Upon validation of the device token, the at least one processor is also programmed to install the first application. Moreover, the at least one processor is programmed to associate the device token with the first application.

In another aspect, a system for installing applications on computer devices is provided. The system includes an installation server including at least one memory device configured to store a first application to install and at least one processor in communication with at least one memory device. The at least one processor is programmed to receive, from a user computer device, a request to install the first application on the user computer device. The at least one processor is also programmed to instruct the user computer device to scan internally for a device token associated with a second application. Upon detection of the device token, the at least one processor is programmed to receive the device token from the user computer device. The at least one processor is further programmed to validate the received device token. Upon validation of the received device token, the at least one processor is also programmed to transmit one or more installation files associated with the first application to the user computer device. Moreover, the at least one processor is programmed to instruct the user computer device to associate the device token with the first application.

In yet a further aspect, at least one non-transitory computer-readable storage media having computer-executable instructions embodied thereon is provided. When executed by at least one processor, the computer-executable instructions cause the processor to receive a request to install a first application on a user computer device. The computer-executable instructions also cause the processor to scan at least one memory device of the user computer device for a device token associated with a second application. Upon detection of the device token, the computer-executable instructions cause the processor to retrieve the device token from the at least one memory device of the user computer device. The computer-executable instructions further cause the processor to validate the retrieved device token. Upon validation of the device token, the computer-executable instructions also cause the processor to install the first application. Moreover, the computer-executable instructions cause the processor to associate the device token with the first application.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

DETAILED DESCRIPTION

Figure 1:
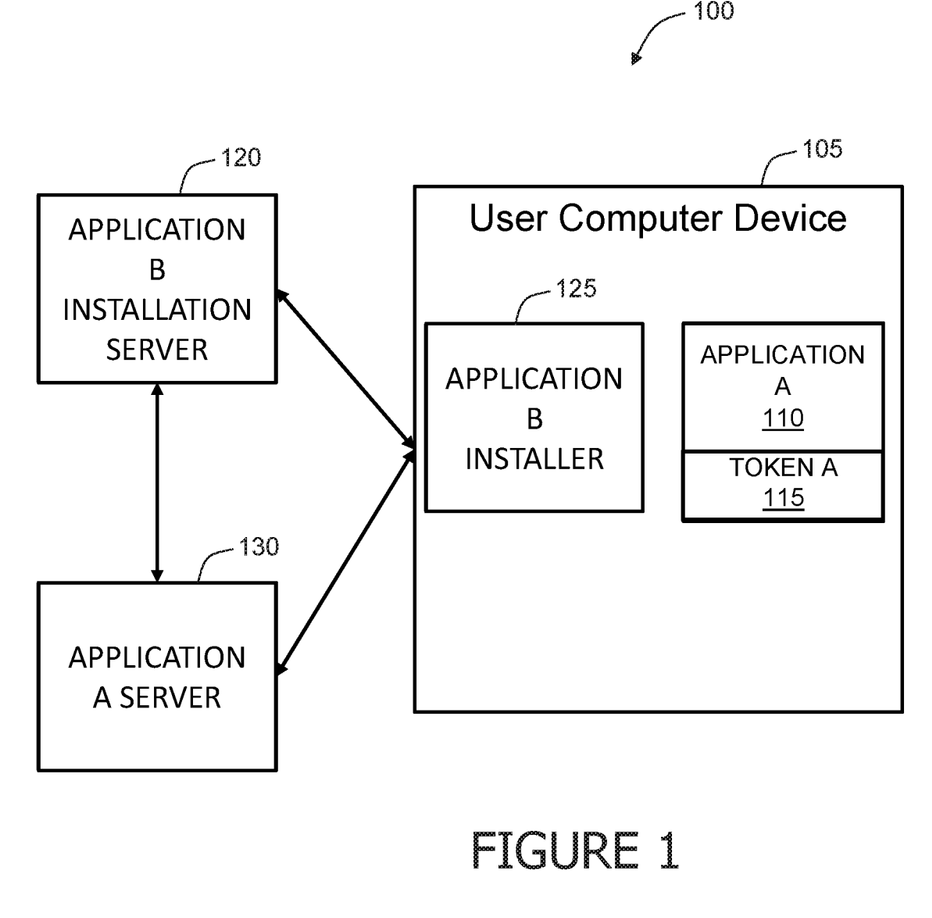
FIG. 1 illustrates a data flow diagram of an exemplary system for installing applications on a user computer device in accordance with one embodiment of the disclosure.

FIG. 1 illustrates a data flow diagram of an exemplary system 100 for installing applications on a user computer device 105 in accordance with one embodiment of the disclosure.

In the exemplary embodiment, the user computer device 105 includes Application A 110 which has been previously installed on the user computer device 105. Application A 110 is associated with a Token A 115. In the exemplary embodiment, Token A 115 identifies the user computer device 105 when Application A 110 is used. For example, Application A 110 may be a banking application that allows a user to access their bank account. In some embodiments, when Application A 110 is activated, the user is requested to login to the application. The login information and Token A 115 are transmitted to Application A Server 130. Application A Server 130 uses login information and Token A 115 to authenticate the user and the device, respectively, prior to allowing the user access to his or her account. In some embodiments, Token A 115 was registered with Application A Server 130. During the registration process, Token A 115 is issued by a remote server, such as Application A Server 130. After the remote server generates Token A 115, Token A 115 is protected using public-private key encryption. The signature of Token A 115 is then stored by Application A Server 130 for future reference. To authenticate user computer device 105, Application A Server 130 validates Token A 115 by analyzing the signature of the received version of Token A 115 to the version stored on Application A Server 130 to ensure the integrity of Token A 115.

In the exemplary embodiment, Token A 115 is generated based on a scan of user computer device 105. In these embodiments, Token A 115 is generated based on the results of the scan of user computer device 105 and one or more attributes of the user computer device 105. In some embodiments, Token A is generated based on at least one of a device identifier, one or more attached devices, one or more device settings, one or more software versions installed on the computer device, color, pixel density, applications installed, and one or more stored biometric identifiers.

In the exemplary embodiment, when the user wishes to install a new application on user computer device 105, the user downloads an Application B Installer 125 onto user computer device 105 from Application B Installation Server 120. In some embodiments, Application B Installer 125 is an application configured to install Application B on a user computer device 105. In these embodiments, Application B Installer 125 is downloaded from Application B Installation Server 120 and facilitates communication between the user, user computer device 105 and Application B Installation Server 120. In some embodiments, Application B Installer 125 includes a software development kit (SDK) that is configured to install one or more applications that have a common purpose (e.g., software for financial transactions) or common specialized functionality (e.g., multi-factor secured logins).

In some embodiments, Application B Installation Server 120 is a website associated with Application B. In other embodiments, Application B Installation Server 120 is an app store that is configured to store, sell, and transmit installation files for different application. In these embodiments, Application B Installation Server 120 is a central server that allows a plurality of user computer devices 105 to access and download applications for installation. In some further embodiments, Application B Installation Server 120 assists the user in the installation process, such as by communicating with an Application B Server (not shown) to register the user's installation of application B. In these embodiments, Application B Installation Server 120 may request registration information from user via user computer device 105 and transmit the registration information to Application B Server.

Figure 2:
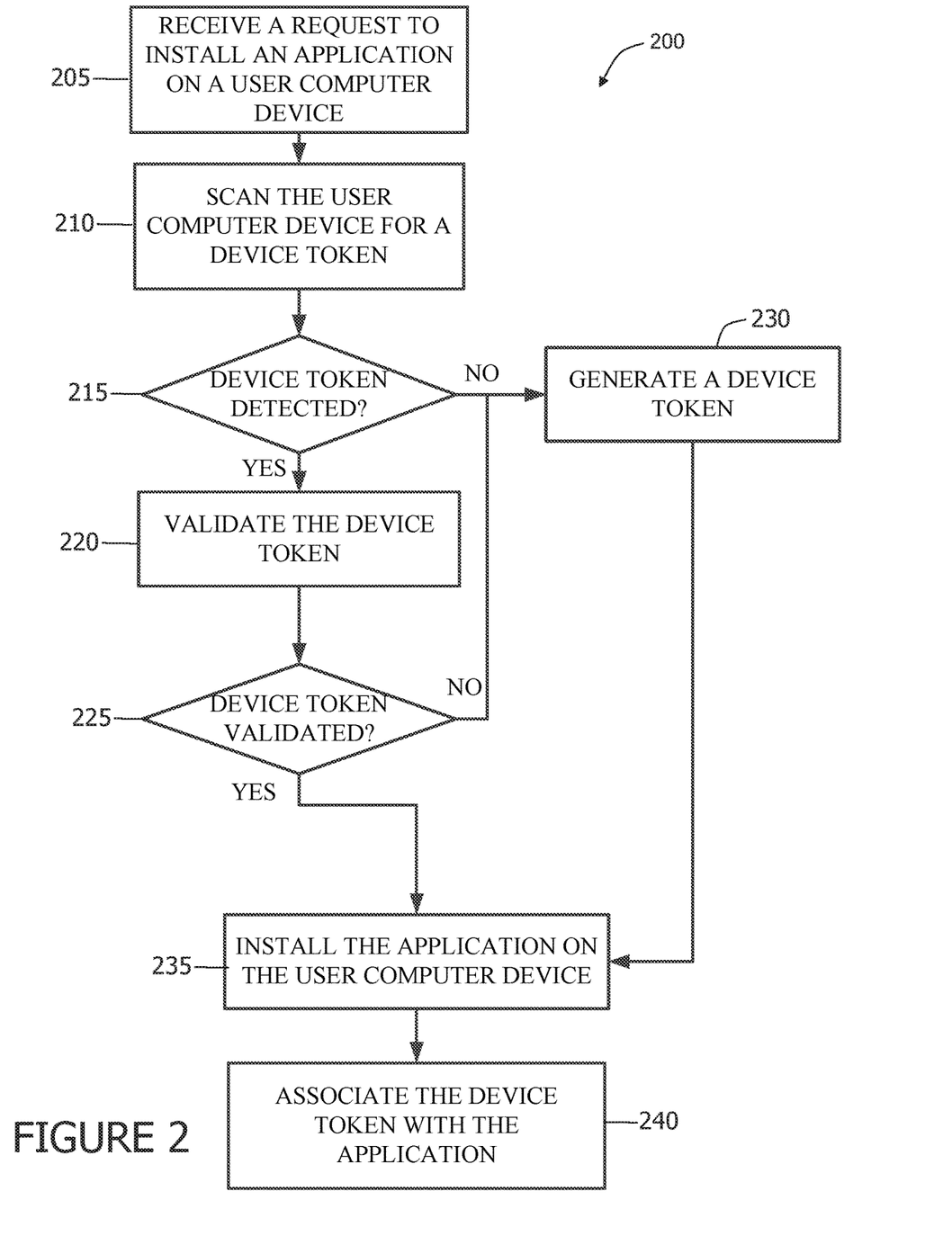
FIG. 2 illustrates an exemplary process for installing applications on a user computer device using the system shown in FIG. 1 in accordance with one embodiment of the disclosure.

FIG. 2 illustrates an exemplary process 200 for installing applications on a user computer device 105 using the system 100 (both shown in FIG. 1) in accordance with one embodiment of the disclosure. In the exemplary embodiment, the steps of process 200 are performed by at least one of user computer device 105 and Application B Installation Server 120 (both shown in FIG. 1).

In the exemplary embodiment, the user computer device 105 receives 205 a request to install an application on the user computer device 105. The user computer device 105 transmits the request to install the application to Application B Installation Server 120. Application B Installation Server 120 transmits the Application B Installer 125 to the user computer device 105. The user computer device activates the Application B Installer 125.

In the exemplary embodiment, the Application B Installer 125 is configured to scan 210 the user computer device 105 for a device token, such as Token A 115. In other embodiments, Application B Installation Server 120 scans 210 the user computer device 105 for the device token. In still further embodiments, Application B Installation Server 120 transmits instructions to user computer device 105 to scan 210 itself for the device token. In some embodiments, the device token to scan for is determined by one of the Application B Installation Server 120 and the Application B Installer 125. The device token to scan for is determined based on at least one second application associated with the first application. The at least one device token is associated with the at least one second application. For example, if the user is installing Application B, the Application B Installer 125 scans 210 for a token associated with Application A 110, such as Token A 115 (both shown in FIG. 1).

In the exemplary embodiment, if the device token is detected 215, one of the Application B Installation Server 120 and the Application B Installer 125 validates 220 the device token. In some embodiments, the Application B Installer 125 retrieves the device token the device token from the user computer device 105. The Application B Installer 125 transmits, to the Application B Installation Server 120, a copy of the device token for validation. The Application B Installation Server 120 validates the device token. The Application B Installer 125 receives, from the Application B Installation Server 120, the results of the validation of the device token.

In some embodiments, Application B Installer 125 encrypts Token A 115 and transmits the encrypted token to Application B Installation Server 120. In some embodiments, Application B Installer 125 encrypts the Token A 115 with a private encryption key assigned to the Installer 125 by Application B Installation Server 120. Application B Installation Server 120 decrypts the transmission to obtain Token A 115. Then Application B Installation Server 120 contacts Application A Server 130, such as via an advanced programming interface (API) call, and transmits Token A 115 the Application A Server 130. Application A Server 130 validates Token A 115, such as by analyzing Token A's signature with a stored version of that signature. Application A Server 130 then informs Application B Installation Server 120 of the results of the validation. In some embodiments, Application B Installation Server 120 instructs Application B Installer 125 to abort installation of Application B. In other embodiments, Application B Installer 125 considers the failed validation as an indicator that no token exists and acts accordingly.

In the exemplary embodiment, if the device token is validated 225, the Application B Installer 125 installs 235 the application on the user computer device 105. The Application B Installer 125 associates 240 the device token with the application. For example, Token A 115 would be associated with both Application A 110 and installed Application B. Both applications would utilize Token A 115 for validation purposes.

In some embodiments, one of the Application B Installation Server 120 and the Application B Installer 125 determines a remote server associated with the second application, such as Application A Server 130 associated with Application A 110. In these embodiments, the one of the Application B Installation Server 120 and the Application B Installer 125 request registration information for the second application from the remote server. The one of the Application B Installation Server 120 and the Application B Installer 125 applies the registration information for the second application to the first application. In some further embodiments, the one of the Application B Installation Server 120 and the Application B Installer 125 transmits the registration information and the device token to a remote application server associated with the first application, such as Application B Server (not shown).

In some embodiments, if a device token is not detected on user computer device 105, then one of the Application B Installation Server 120 and the Application B Installer 125 generates 230 a device token. During the generation process, the device token is issued by a remote server, such as Application B Installation Server 120 and the Application B Installer 125. After the remote server generates the device token, the device token is protected using public-private key encryption. The signature of device token is then stored by the remote server for future reference.

In the exemplary embodiment, the device token is generated 230 based on at least one of a device identifier, one or more attached devices, one or more device settings, one or more software versions installed on the computer device, color, pixel density, applications installed, and one or more stored biometric identifiers. In some further embodiments, the one of the Application B Installation Server 120 and the Application B Installer 125 encrypts the generated device token with a public key encryption and configures a security wrapper for the generated device token.

After the device token is generated 230, the Application B Installer 125 installs 235 the application on the user computer device 105. The Application B Installer 125 associates 240 the device token with the application. In some embodiments, the one of the Application B Installation Server 120 and the Application B Installer 125 receives registration information from a user, such as through an interface on user computer device 105. The one of the Application B Installation Server 120 and the Application B Installer 125 associates the registration information with the generated device token. In some embodiments, the one of the Application B Installation Server 120 and the Application B Installer 125 generate 230 a new device token if the detected device token is not validated in Step 225.

Figure 3:
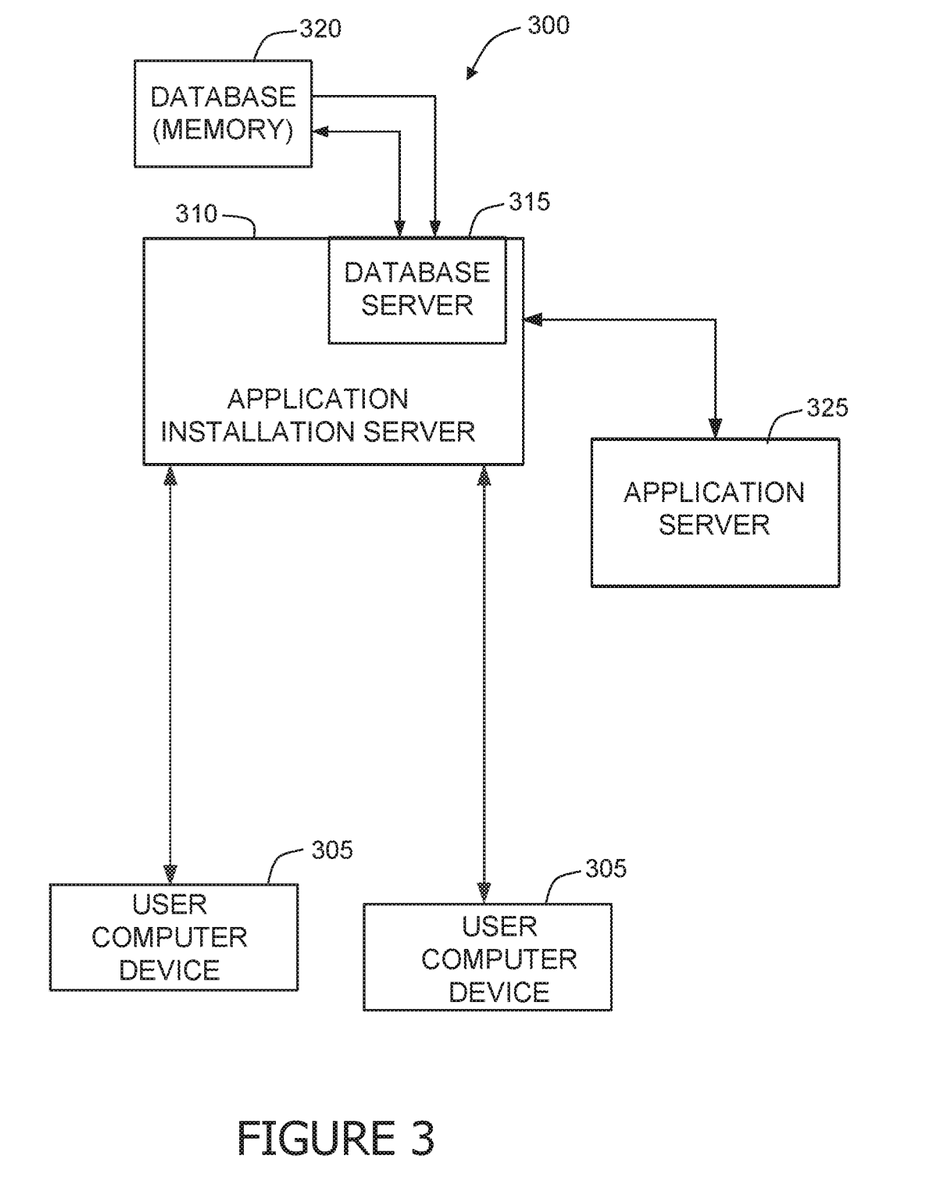
FIG. 3 illustrates a simplified block diagram of an exemplary application installation system for performing installing applications on a plurality of user computer devices in accordance with one embodiment of the disclosure.

FIG. 3 illustrates a simplified block diagram of an exemplary application installation system 300 for performing installing applications on a plurality of user computer devices 305 in accordance with one embodiment of the disclosure. In the exemplary embodiment, system 300 may be used for installing applications on user computer devices 305 with signed device tokens. As described herein, an application installation ("AI") server 310 (also known as a AI computer device 310), may be configured to (i) receive a request to install an application from a user computer device 305; (ii) scan the user computer device 305 for a device token; (iii) upon detection of the device token, retrieve the device token; (iv) validate the device token; (v) install the application on the user computer device; and (vi) associate the device token with the application, as described herein.

In the exemplary embodiment, user computer devices 305 are computers that include a web browser or a software application, which enables user computer devices 305 to access remote computer devices, such as AI server 310 and application server 325, using the Internet or other network. More specifically, user computer devices 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer devices 305 are similar to user computer device 105 (shown in FIG. 1).

A database server 315 is communicatively coupled to a database 320 that stores data. In one embodiment, database 320 may include device prints, token information, registration information, and application installation files. In some embodiments, database 320 is stored remotely from AI server 310. In some embodiments, database 320 is decentralized. In the exemplary embodiment, a user, may access database 320 via user computer device 305 by logging onto AI server 310, as described herein. In some embodiments, database 320 includes any computer server, cloud or other digital data storage device.

AI server 310 may be in communication with a plurality of user computer devices 305 and a plurality of application servers 325, to install applications associated with those servers 325. In some embodiments, AI server 310 is similar to Application B Installation Server 120 (shown in FIG. 1).

In the exemplary embodiment, application server 325 is a remote server accessed in the execution of an application installed on the user computer device 305. For example, application server 325 may be associated with a bank and be accessed during the execution of a banking application. In the exemplary embodiment, application server 325 is a computer that allows remote computers that include a web browser or a software application, such as user computer devices 305, to access for communication, using the Internet or other network. More specifically, application server 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Application server 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, application server 325 is similar to Application A Server 130 (shown in FIG. 1).

Figure 4:
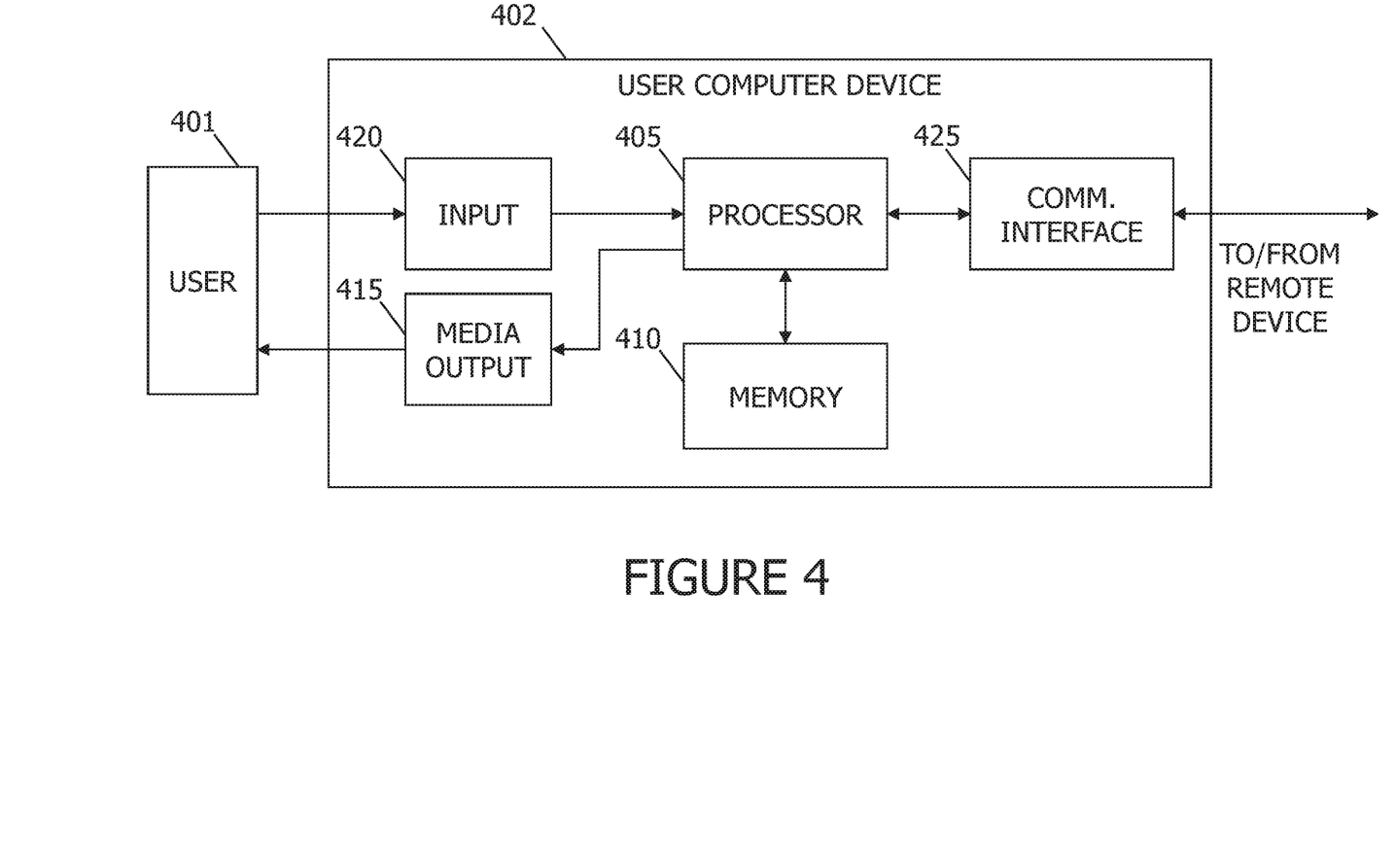
FIG. 4 illustrates an exemplary configuration of a client computer device as shown in FIGS. 1 and 3, in accordance with one embodiment of the present disclosure.

FIG. 4 depicts an exemplary configuration of client computer device shown in FIGS. 1 and 3, in accordance with one embodiment of the present disclosure. User computer device 402 may be operated by a user 401. User computer device 402 may include, but is not limited to, user computer device 105 (shown in FIG. 1) and user computer devices 305 (shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for accessing a banking application. In some embodiments, user computer device 402 may include an input device 420 for receiving input from user 401. User 401 may use input device 420 to, without limitation, conduct a financial transaction.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as AI server 310 and application server 325 (both shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from AI server 310 or application server 325. A client application may allow user 401 to interact with, for example, AI server 310. For example, instructions may be stored by a cloud service, and the output of the execution of the instructions sent to the media output component 415.

Figure 5:
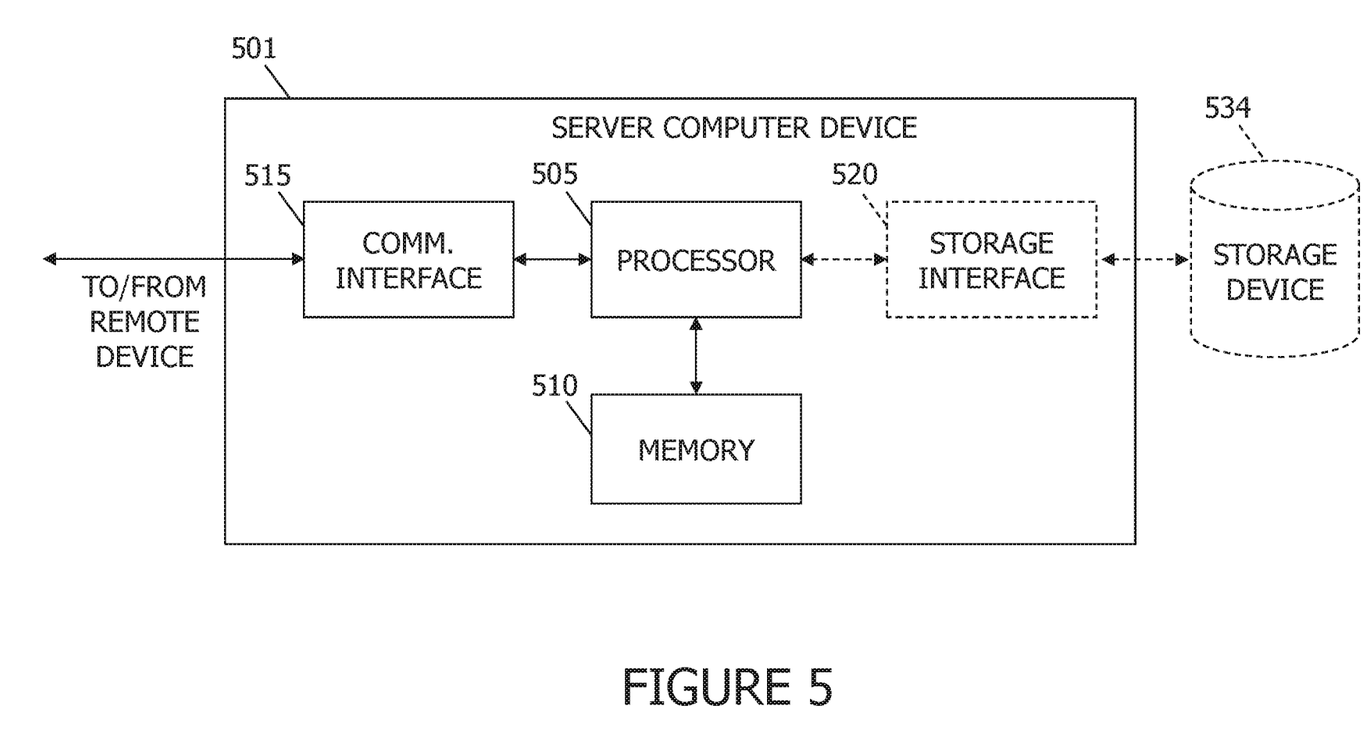
FIG. 5 illustrates an exemplary configuration of a server system as shown in FIGS. 1 and 3, in accordance with one embodiment of the present disclosure.

FIG. 5 depicts an exemplary configuration of server system as shown in FIGS. 1 and 3, in accordance with one embodiment of the present disclosure. Server computer device 501 may include, but is not limited to, Application B Installation Server 120, Application A Server 130 (both shown in FIG. 1), database server 320, AI server 310, and application server 325 (all shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, AI server 310, application server 325, and user computer devices 305 (shown in FIG. 7) (for example, using wireless communication or data transmission over one or more radio links or digital communication channels). For example, communication interface 515 may receive requests from user computer devices 305 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instructions.

At least one of the technical solutions to the technical problems provided by this system may include: (i) improved speed of installation of applications on mobile devices; (ii) reduced resource requirement for installation of applications on mobile devices; (iii) commonality of device tokens between related applications; (iv) improved device security for trusted applications; (v) improved security of device tokens; and (vi) reduced fraud risk on application use from trusted user computer devices.

The methods and systems described herein may be implemented using computer programming or engineering techniques including computer software, firmware, hardware, or any combination or subset thereof, wherein the technical effects may be achieved by performing at least one of the following steps: (a) receive a request to install a first application; (b) determine at least one second application associated with the first application; (c) determine at least one device token to scan for, wherein the at least one device token is associated with the at least one second application; (d) scan the at least one memory device for the at least one device token; (e) upon detection of the device token, retrieve the device token from the memory; (f) validate the retrieved device token; (g) transmit, to the installation server, a copy of the device token for validation; (h) receive, from the installation server, the results of the validation of the device token; (i) upon validation of the device token, install the first application; (j) generate a new device token if the detected device token is not validated; (k) associate the device token with the first application; (l) determine a remote server associated with the second application; (m) request registration information for the second application from the remote server; (n) apply the registration information for the second application to the first application; and (o) transmit the registration information and the device token to a remote application server associated with the first application.

In some further embodiments, the technical effects may also be achieved by performing at least one of the following steps: (a) if a device token is not detected, generate a device token based on at least one of a device identifier, one or more attached devices, one or more device settings, one or more software versions installed on the computer device, and one or more stored biometric identifiers; (b) encrypt the generated device token with a public key encryption; (c) configure a security wrapper for the generated device token; (d) install the first application on the user computer device; (e) associate the generated device token with the first application; (f) receive registration information from a user; and (g) associate the registration information with the generated device token.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer device configured to install computer applications comprising at least one processor in communication with at least one memory device, the at least one processor programmed to:
   receive a request to install a first application on a user computer device;
   scan at least one memory device of the user computer device for a device token associated with a second application;
   upon detection of the device token, retrieve the device token from the at least one memory device of the user computer device;
   validate the retrieved device token;
   upon validation of the device token, install the first application; and
   associate the device token with the first application.

2. A computer device in accordance with claim 1, wherein the at least one processor is further programmed to:
   if a device token is not detected, generate a device token;
   install the first application on the user computer device; and
   associate the generated device token with the first application.

3. A computer device in accordance with claim 2, wherein the at least one processor is further programmed to:
   encrypt the generated device token with a public key encryption; and
   configure a security wrapper for the generated device token.

4. A computer device in accordance with claim 2, wherein the at least one processor is further programmed to:
   receive registration information from a user; and
   associate the registration information with the generated device token.

5. A computer device in accordance with claim 2, wherein the at least one processor is further programmed to generate the device token based on at least one of a device identifier, one or more attached devices, one or more device settings, one or more software versions installed on the computer device, and one or more stored biometric identifiers.

6. A computer device in accordance with claim 1, wherein the at least one processor is further programmed to:
   determine at least one second application associated with the first application;
   determine at least one device token to scan for, wherein the at least one device token is associated with the at least one second application; and
   scan the at least one memory device for the at least one device token.

7. A computer device in accordance with claim 1, wherein the at least one processor is further programmed to:
   transmit, to the installation server, a copy of the device token for validation; and
   receive, from the installation server, the results of the validation of the device token.

8. A computer device in accordance with claim 1, wherein the at least one processor is further programmed to generate a new device token if the detected device token is not validated.

9. A computer device in accordance with claim 1, wherein the at least one processor is further programmed to:
   determine a remote server associated with the second application;
   request registration information for the second application from the remote server; and
   apply the registration information for the second application to the first application.

10. A computer device in accordance with claim 9, wherein the at least one processor is further programmed to transmit the registration information and the device token to a remote application server associated with the first application.

11. A system for installing applications on computer devices comprising an installation server comprising:
    at least one memory device configured to store a first application to install; and
    at least one processor in communication with at least one memory device, the at least one processor programmed to:
       receive, from a user computer device, a request to install the first application on the user computer device;
       instruct the user computer device to scan internally for a device token associated with a second application;
       upon detection of the device token, receive the device token from the user computer device;
       validate the received device token;
       upon validation of the received device token, transmit one or more installation files associated with the first application to the user computer device; and
       instruct the user computer device to associate the device token with the first application.

12. A system in accordance with claim 11, wherein the at least one processor is further programmed to:
    if a device token is not detected, generate a device token;
    transmit one or more installation files associated with the first application and the generated device token to the user computer device; and
    instruct the user computer device to associate the generated device token with the first application.

13. A system in accordance with claim 12, wherein the at least one processor is further programmed to:
    encrypt the generated device token with a public key encryption; and
    configure a security wrapper for the generated device token.

14. A system in accordance with claim 12, wherein the at least one processor is further programmed to:

receive registration information from the user computer device; and associate the registration information with the generated device token.

15. A system in accordance with claim 12, wherein the at least one processor is further programmed to generate the device token based on at least one of a device identifier, one or more attached devices, one or more device settings, one or more software versions installed on the computer device, and one or more stored biometric identifiers.

16. A system in accordance with claim 11, wherein the at least one processor is further programmed to:
   determine at least one second application associated with the first application;
   determine at least one device token to scan for, wherein the at least one device token is associated with the at least one second application; and
   instruct the user computer device to scan for the at least one device token.

17. A system in accordance with claim 11, wherein the at least one processor is further programmed to generate a new device token if the received device token is not validated.

18. A system in accordance with claim 11, wherein the at least one processor is further programmed to:
   determine a remote server associated with the second application;
   request registration information for the second application from the remote server; and
   apply the registration information for the second application to the first application.

19. A system in accordance with claim 18, wherein the at least one processor is further programmed to transmit the registration information and the device token to a remote application server associated with the first application.

20. At least one non-transitory computer-readable storage media having computer-executable instructions embodied thereon, when executed by at least one processor, the computer-executable instructions cause the processor to:
   receive a request to install a first application on a user computer device;
   scan at least one memory device of the user computer device for a device token associated with a second application;
   upon detection of the device token, retrieve the device token from the at least one memory device of the user computer device;
   validate the retrieved device token;
   upon validation of the retrieved device token, install the first application; and
   associate the device token with the first application.

* * * * *